(12) United States Patent
Hill

(10) Patent No.: US 7,042,574 B2
(45) Date of Patent: May 9, 2006

(54) COMPENSATING FOR EFFECTS OF NON-ISOTROPIC GAS MIXTURES IN INTERFEROMETERS

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 344 days.

(21) Appl. No.: 10/309,394

(22) Filed: Dec. 3, 2002

(65) Prior Publication Data

US 2003/0128369 A1    Jul. 10, 2003

Related U.S. Application Data

(60) Provisional application No. 60/337,459, filed on Dec. 3, 2001.

(51) Int. Cl.
*G01B 9/02*    (2006.01)

(52) U.S. Cl. .................. 356/498; 356/450; 356/517

(58) Field of Classification Search ............... 356/517, 356/486, 450, 500, 498
See application file for complete search history.

(56) References Cited

U.S. PATENT DOCUMENTS

| | | |
|---|---|---|
| 4,948,254 A | 8/1990 | Ishida |
| 5,114,234 A | 5/1992 | Otsuka |
| 5,404,222 A | 4/1995 | Lis |
| 5,408,318 A | 4/1995 | Slater |
| 5,483,343 A | 1/1996 | Iwamoto et al. |
| 5,491,550 A | 2/1996 | Dabbs |
| 5,715,057 A | 2/1998 | Bechstein et al. |
| 5,757,160 A | 5/1998 | Kreuzer |
| 5,757,489 A | 5/1998 | Kawakami |
| 5,764,361 A | 6/1998 | Kato et al. |
| 5,764,362 A | 6/1998 | Hill et al. |
| 5,801,832 A | 9/1998 | Van Den Brink |
| 5,877,843 A | 3/1999 | Takagi et al. .................. 355/30 |
| 5,892,572 A * | 4/1999 | Nishi ........................... 355/67 |
| 5,991,033 A | 11/1999 | Henshaw et al. |
| 6,020,964 A | 2/2000 | Loopstra |
| 6,040,096 A | 3/2000 | Kakizaki |
| 6,046,792 A | 4/2000 | Van Der Werf |
| 6,124,931 A * | 9/2000 | Hill ............................ 356/517 |
| 6,134,007 A | 10/2000 | Naraki |
| 6,160,619 A | 12/2000 | Magome |
| 6,219,144 B1 | 4/2001 | Hill et al. |
| 6,304,318 B1 | 10/2001 | Simon |
| 6,327,039 B1 | 12/2001 | de Groot et al. |
| 6,330,065 B1 | 12/2001 | Hill |
| 6,417,927 B1 | 7/2002 | de Groot |
| 6,541,759 B1 | 4/2003 | Hill |
| 6,731,371 B1 * | 5/2004 | Shiraishi ....................... 355/30 |
| 2002/0001086 A1 | 1/2002 | de Groot |
| 2002/0048026 A1 | 4/2002 | Isshiki et al. |

OTHER PUBLICATIONS

Bennett, S.J. "A double-passed michelson interferometer." Optics Communications, 4:6, pp. 428.430, 1972.

Bobroff, N. "Recent advances in displacement measureing interferometry." Meas. Sci. Technol, 4, pp. 907-926, 1993.

(Continued)

*Primary Examiner*—Andrew H. Lee
(74) *Attorney, Agent, or Firm*—Fish & Richardson P.C.

(57) ABSTRACT

Methods and apparatus for reducing the effects of non-isotropic gas distributions on interferometry measurements are disclosed.

42 Claims, 9 Drawing Sheets

OTHER PUBLICATIONS

Bobroff, N. "Residual errors in laser interferometry from air turbulence and nonlinearity." Applied Optics, 26:13, pp. 2676-2682, Jul. 1, 1987.

Oka, K. et al. "Polarization heterodyne interferometry using another local oscillator beam." Optics Communication, 92, pp. 1-5, 1992.

* cited by examiner

COMPENSATING FOR EFFECTS OF NON-ISOTROPIC GAS MIXTURES IN INTERFEROMETERS

CROSS-REFERENCE TO RELATED APPLICATIONS

This application claims priority to Provisional Patent Application 60/337,459, entitled "A METHOD FOR COMPENSATION FOR EFFECTS OF NON-ISOTROPIC GAS MIXTURES IN SINGLE-WAVELENGTH AND MULTIPLE-WAVELENGTH DISPERSION INTERFEROMETRY," to Henry Hill, and filed Dec. 3, 2001, the entire contents of which are hereby incorporated by reference in their entirety.

BACKGROUND

Displacement-measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2\nu np/\lambda$, where $\nu$ is the relative speed of the measurement and reference objects, $\lambda$ is the wavelength of the measurement and reference beams, n is the refractive index of the medium through which the light beams travel, e.g., air or vacuum, and p is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object.

Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors." The cyclic errors can be expressed as contributions, to the phase and/or the intensity of the measured interference signal and have a sinusoidal dependence on the change in optical path length pnL. In particular, the first harmonic cyclic error in phase has a sinusoidal dependence on $(2\pi pnL)/\lambda$ and the second harmonic cyclic error in phase has a sinusoidal dependence on $2(2\pi pnL)/\lambda$. Higher harmonic cyclic errors can also be present.

Another source of errors are related to environmental effects such as air turbulence and non-isotropic distributions of gases in the interferometer evironment. See, for example, an article entitled "Residual Errors In Laser Interferometry From Air Turbulence And Nonlinearity," by N. Bobroff, *Appl. Opt.* 26(13), 2676–2682 (1987), and an article entitled "Recent Advances In Displacement Measuring Interferometry," also by N. Bobroff, *Measurement Science & Tech.* 4(9), 907–926 (1993). As noted in the aforementioned cited references, interferometric displacement measurements in a gas are subject to environmental uncertainties, particularly to changes in air pressure and temperature; to uncertainties in air composition such as resulting from changes in humidity and/or the presence of additional gases; and to the effects of turbulence in the gas. Such factors alter the wavelength of the light used to measure the displacement. Under normal conditions, the refractive index of air for example is approximately 1.0003 with a variation of the order of $1\times10^{-5}$ to $1\times10^{-4}$. In many applications the refractive index of air must be known with a relative precision of less than 0.1 ppm (parts per million) to less than 0.001 ppm, these two relative precisions corresponding to a displacement measurement accuracy of 100 nm and less than 1 nm, respectively, for a one meter interferometric displacement measurement.

One way to detect refractive index fluctuations is to measure changes in pressure and temperature along a measurement path and calculate the effect on the optical path length of the measurement path. Another, more direct way to detect the effects of a fluctuating refractive index over a measurement path is by multiple-wavelength distance measurement. The basic principle may be understood as follows. Interferometers and laser radar measure the optical path length between a reference and an object, most often in open air. The optical path length is the integrated product of the refractive index and the physical path traversed by a measurement beam. In that the refractive index varies with wavelength, but the physical path is independent of wavelength, it is generally possible to determine the physical path length from the optical path length, particularly the contributions of fluctuations in refractive index, provided that the instrument employs at least two wavelengths. The variation of refractive index with wavelength is known in the art as dispersion and this technique is often referred to as the dispersion technique or as dispersion interferometry.

SUMMARY

The accuracy of interference measurements can also be improved by reducing refractive index fluctuations due to composition variations in a gas in an interferometer measurement beam path. One way to reduce such refractive index fluctuations is to keep the gas composition near the interferometer constant. However, in many systems, it is not practical (or even possible) to maintain a constant gas composition. Many systems utilize differing gas compositions at different stages during their use. For example, while maintaining a certain background gas composition, many systems introduce one or more process gases into the system's environment during their use. Moreover, in many systems it is extremely difficult, or impossible, to maintain a constant gas composition over an extended period due to, e.g., leaky seals and/or outgassing or evaporation of volatile compounds from system components.

A lithography system is one example of where an interferometer is used for high-precision measurements. During the operation of such a system, the gas composition within a chamber housing the system can vary due to one or more factors. For example, in many lithography systems, a wafer is exposed to UV radiation in a nitrogen-rich environment. This is because, compared to oxygen (e.g., the oxygen in air), nitrogen minimally absorbs UV radiation.

Ideally, such a lithography system would maintain a 100 percent pure nitrogen environment around the wafer during the exposure. In fact, in many systems, an area proximate to the wafer is purged with dry, extremely pure nitrogen just prior to exposure. However, a pure nitrogen environment is highly susceptible to static discharge, which can be damaging to the wafer being processed. Accordingly, many lithography systems maintain a nitrogen-rich background atmosphere that contains a small amount of water vapor and/or oxygen to reduce static discharge. The amount of this secondary gas (e.g., water vapor and/or oxygen) in the system can vary as a function of time. In some cases, a small amount of the secondary gas is introduced to the system at periodic intervals. Thus, the concentration of the secondary gas is highest immediately after being introduced, and it drops thereafter.

Often, the secondary gas will have a different refractivity than the background gas. In such situations, not only will the average refractivity of the atmosphere in the chamber vary as a function of the concentration of the secondary gas, but the local refractive index can also vary while the secondary gas is non-isotropically distributed in the chamber atmosphere.

Another example where small changes in the concentration of a secondary gas component in the system can give rise to variations in the average and/or local refractivity of the system atmosphere is when an external gas leaks into the chamber. Examples of this include where air leaks into the chamber through a corrupt seal, or where air (or some other gas) leaks into the chamber from air bearings used to support system components within the chamber. The gas in an air bearing is usually at high pressure and can be contaminated with undesirable components, such as organic compounds. One source of organic compounds are, e.g., compounds from pump oil in a pump used to supply high-pressure gas to the bearings. Thus, even if the gas used in an air bearing has the same nominal composition as the chamber atmosphere, contaminants in the bearing gas can cause refractivity variations if leaked into the chamber.

In general, for an isotropic atmosphere in a closed environment composed of a background gas, the refractivity of the atmosphere will be equal to the refractivity of the background gas. Introducing a secondary gas having a different refractivity to the environment can cause the average refractivity of the atmosphere to change. In addition, while the secondary gas is non-isotropically distributed, the secondary gas can cause local fluctuations in the atmosphere's refractivity that can be detrimental to high-accuracy interferometry measurements performed in the atmosphere.

Accordingly, in certain aspects, the invention features an apparatus and/or method for reducing (e.g., eliminating) the effects of variations in the refractivity of a non-isotropic gas mixture on interferometer measurements. This is achieved by supplying a compensating gas to the chamber to reduce the effects of a secondary gas on the chamber atmosphere's refractivity. In preferred embodiments, the compensating gas is mixed with the secondary gas prior to (or while) the secondary gas being introduced into the chamber. The compensating gas is selected so that a value of an intrinsic refractive property (e.g., specific refractivity or reciprocal dispersive power) of the compensating gas/secondary gas mixture is the same as (or at least similar to) the value of the intrinsic refractive property of the background gas in the chamber. The compensating gas/secondary gas mixture is referred to as the modified secondary gas mixture below. Because their values of an intrinsic refractive property is the same, effects of non-isotropic distributions of the modified secondary gas mixture in the background gas do not substantially affect the refractivity of the atmosphere in the chamber. Accordingly, the invention can enable more accurate interferometry measurements to be made in such an atmosphere.

In one aspect, the invention features a method for compensating the effects of non-isotropic gas mixtures of a background gas and a secondary gas in measurement paths of single-wavelength interferometers including adding a compensating gas to the secondary gas such that the specific refractivity of combinations of background and modified secondary gas mixture are isotropic independent of the concentration of the gas mixture. The isotropic condition with respect to specific refractivity is met when the specific refractivities of the background gas and the modified secondary gas mixture are the same.

In multiple-wavelength dispersion interferometry, the invention features a method for compensating for the effects of non-isotropic gas mixtures including adding a compensating gas to the secondary gas such that an intrinsic refractive property of the combination of background gas and the modified secondary gas mixture is isotropic independent at least in first order of the concentration of the modified secondary gas mixture. The isotropic condition with respect to the intrinsic refractive property is met when the intrinsic refractive properties of the background gas and the modified secondary gas mixture are the same. The reciprocal dispersive power of a gas is an intrinsic refractive property that may be used in two-wavelength dispersion interferometry.

Embodiments of the invention can be adapted to dispersion interferometry applications that are based on three or more wavelengths wherein a corresponding intrinsic refractive property of the gas in the measurement path including the background gas and the modified secondary gas mixture is independent of the concentration of the modified secondary gas mixture along the measurement path.

In each case, the background, secondary gas, and compensating gas may each include one or more constituents.

In general, in a first aspect, the invention features a method including: (i) making an interferometry measurement in a chamber, the chamber having an atmosphere that has a first value of an intrinsic refractive property; (ii) introducing a secondary gas into the chamber to adjust a composition of the chamber atmosphere; and (iii) introducing a compensating gas into the chamber. The compensating gas reduces variations in the intrinsic refractive property of the atmosphere from the first value caused by the introduction of the secondary gas.

The method may include one or more of the following features, and/or features of other aspects of the invention.

The interferometry measurement can measure the position of a movable stage in the chamber. The interferometry measurement can include deriving a measurement beam and a reference beam from an input beam having a first wavelength, directing the measurement beam to reflect from a measurement object, overlapping the reflected measurement beam with the reference beam, and detecting an intensity of the overlapping reflected measurement beam and reference beam.

The compensating gas can be introduced into the chamber while introducing the secondary gas. In some embodiments, the method includes flowing a background gas through the chamber, wherein the chamber atmosphere comprises the background gas. In these embodiments, introducing the secondary gas into the chamber can include adding the secondary gas to the background gas prior to flowing the background gas through the chamber. Alternatively, or additionally, introducing the compensating gas into the chamber can include adding the compensating gas to the background gas prior to flowing the background gas through the chamber.

In some embodiments, introducing the secondary and compensating gases includes introducing a gas mixture into the chamber, where the gas mixture includes the secondary gas and the compensating gas. In embodiments where the gas is introduced as a mixture, introducing the gas mixture can include leaking the gas mixture into the chamber (e.g., from an air bearing).

The chamber can house a photolithography exposure apparatus. In such embodiments, the interferometric measurement and secondary gas introduction can occur during an exposure cycle of the photolithography exposure apparatus.

In some embodiments, the chamber houses a beam writing apparatus.

The intrinsic refractive property can be a specific gas refractivity. The chamber atmosphere can include a background gas having a specific refractivity $(n_1-1)_s$ at a first wavelength, the secondary gas having a specific refractivity $(n_2-1)_s$ at the first wavelength, and the compensating gas having a specific refractivity $(n_3-1)_s$ at the first wavelength, wherein $(n_1-1)_s \neq (n_2-1)_s$. In some embodiments, $(n_1-1)_s > (n_2-1)_s$ and $(n_3-1)_s > (n_1-1)_s$. Alternatively, in other embodiments, $(n_1-1)_s < (n_2-1)_s$ and $(n_3-1)_s < (n_1-1)_s$. In some embodiments, the secondary gas has fractional partial pressure, $x_2$, and the compensating gas has a fractional partial pressure, $x_3$, and $$x_3 \simeq -\frac{[(n_2-1)_s - (n_1-1)_s]}{[(n_3-1)_s - (n_1-1)_s]} x_2.$$

The interferometry measurement can be a dispersive interferometric measurement. For dispersive interferometry, the intrinsic refractive property can be a reciprocal dispersive power. A fractional partial pressure of the compensation gas can be related to a fractional partial pressure of the secondary gas based on a specific refractivity of the secondary and compensation gases at a first wavelength, $\lambda_1$, and at a second wavelength, $\lambda_2$. In such embodiments, the atmosphere can include a background gas, and a fractional partial pressure of the compensation gas can be related to a fractional partial pressure of the secondary gas based on a reciprocal dispersive power of the background gas, a reciprocal dispersive power of the secondary gas, and a reciprocal dispersive power of the compensation gas. Furthermore, the secondary gas can have fractional partial pressure, $x_2$, and the compensation gas has a fractional partial pressure, $x_3$, and $$x_3 = -\left[\frac{(n_2-1)_{\lambda 2} - (n_2-1)_{\lambda 1}}{(n_3-1)_{\lambda 2} - (n_3-1)_{\lambda 1}}\right]\left[\frac{\Gamma_2 - \Gamma_1}{\Gamma_3 - \Gamma_1}\right] x_2,$$

wherein $\Gamma_1$, $\Gamma_2$, and $\Gamma_3$ are the reciprocal dispersive powers of the background, secondary, and compensation gases, respectively, $(n_2-1)_{\lambda 1}$ and $(n_2-1)_{\lambda 2}$ are the specific refractivity's of the second gas at the first and second wavelengths, respectively, and $(n_3-1)_{\lambda 1}$ and $(n_3-1)_{\lambda 2}$ are the specific refractivity's of the third gas at the first and second wavelengths, respectively.

The chamber atmosphere can include air or nitrogen. The secondary gas can include $H_2O$, $O_2$, a hydrocarbon, or mixtures thereof. The compensating gas can include $CO_2$, $NO_2$, $CH_3CH_3$ or mixtures thereof.

In some embodiments, the method includes measuring an intrinsic refractive property of the atmosphere at a location in the system, and correcting the interferometric measurement based on the measured intrinsic refractive property.

In another aspect, the invention features a system including a movable stage, an interferometry system configured to measure a position of the movable stage along a measurement path, and a chamber housing the movable stage and the interferometry system, the chamber having an atmosphere that has a first value of an intrinsic refractive property. The system also includes secondary and compensating gas sources configured to introduce a secondary gas and compensating gas into the chamber, wherein the compensating gas reduces variations in the intrinsic refractive property of the atmosphere from the first value caused by the introduction of the secondary gas.

Embodiments of the system can include one or more of the following features, and/or features of other aspects of the invention. The system can be configured to implement the method of the first aspect.

The system can include photolithography exposure apparatus, the photolithography exposure apparatus being housed in the chamber. The photolithography exposure apparatus can include an illumination source and during operation of the system, the movable stage positions a wafer relative to the illumination source.

The system can include beam writing apparatus, the beam writing apparatus being housed in the chamber. The beam writing apparatus can include a beam source and during operation of the system the movable stage positions a wafer relative to the beam source.

The system can include a gas inlet configured to introduce the secondary gas and the compensating gas into the chamber. Alternatively, or additionally, the system can include a gas exhaust configured to exhaust gas out of the chamber. The system can further include a gas manifold configured to direct secondary gas and compensating gas from the secondary gas source and compensating gas source to the gas inlet. The system can also include a background gas source configured to introduce a background gas into the chamber, wherein the chamber atmosphere includes the background gas. The gas manifold can be configured to direct the background gas from the background gas source to the gas inlet. In some embodiments, the secondary and compensating gases are added to the background gas prior to being introduced to the chamber.

The system can include air bearings configured to support the movable stage, wherein the air bearings are inflated with the secondary and compensating gases.

In some embodiments, the interferometry system includes a refractometer configured to monitor a refractivity of the atmosphere at a first position within the chamber. The interferometry system can include a wavelength monitor configured to monitor a wavelength of a measurement beam used in the interferometry system.

Embodiments of the invention may include one or more of the following advantages.

Embodiments of the invention may improve the accuracy of interferometry in systems utilizing varying atmosphere compositions. For example, embodiments can improve the accuracy of interferometry measurements made in lithography systems and/or beam writing systems.

Another advantage is that the distribution of the concentration of constituents of a gas in a measurement path of an interferometer need not be known in the practice of high-accuracy single-wavelength interferometry and multiple-wavelength dispersion interferometry.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Interferometry systems can provide highly accurate measurements. Such systems can be especially useful in lithography applications used in fabricating large scale integrated circuits such as computer chips and the like. Lithography is a key technology driver for the semiconductor manufacturing industry. In lithography, overlay improvement is one of the five most difficult challenges down to and below 100 nm line widths (design rules), see, for example, the *Semiconductor Industry Roadmap*, p.82 (1997). For a general reference on lithography, see also, for example, J. R. Sheats and B. W. Smith, in *Microlithography: Science and Technology* (Marcel Dekker, Inc., New York, 1998), the contents of which is incorporated herein by reference.

Overlay depends directly on the performance, i.e., accuracy and precision, of the distance measuring interferometers used to position the wafer and reticle (or mask) stages. Since a lithography tool may produce $50–100 M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

Figure 1:
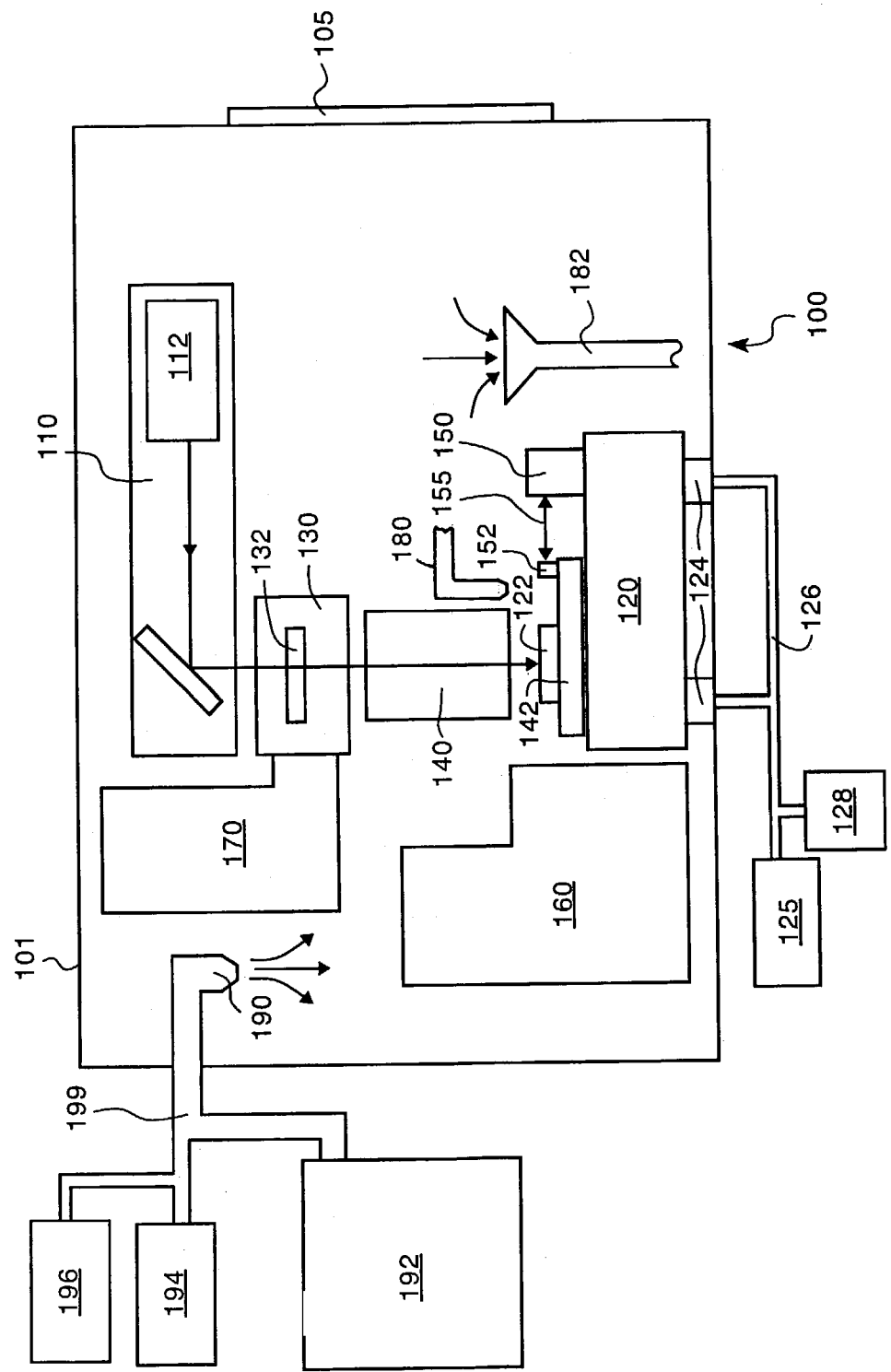
FIG. 1 is a schematic diagram of a lithography system.

Referring to FIG. 1, a lithography system 100, also referred to as an exposure system, typically includes an illumination system 110 and a wafer positioning system 120, and a reticle stage 130. Illumination system 110 includes a radiation source 112 for providing radiation such as ultraviolet, visible, x-ray, electron, or ion radiation. Reticle stage 130 supports a patterned reticle 132, which is also referred to as a mask. These terms are used interchangeably below. Reticle 132 imparts a pattern to radiation from illumination system 110, thereby generating the spatially patterned radiation. For the case of reduction lithography, lithography system 100 also includes a reduction lens 140 for imaging the spatially patterned radiation onto a wafer 122. Wafer positioning system 120 includes a wafer stage 142 that positions and supports wafer 122 during the exposure. Wafer positioning system 120 can also include, e.g., piezoelectric transducer elements and corresponding control electronics. The imaged radiation exposes resist coated onto the wafer. The radiation initiates photo-chemical processes in the resist that convert the radiation pattern into a latent image within the resist.

In embodiments that use proximity printing, as opposed to those implementing reduction lithography, the scattered radiation propagates a small distance (typically on the order of microns) before contacting the wafer to produce a 1:1 image of the reticle pattern.

Lithography system 100 also includes a wafer feeding system 160 and a reticle changer 170. Wafer feeding system 160 is supplied with a batch of wafers and automatically loads wafers on the wafer stage and removes wafers once they have been exposed. Reticle changer 170 selects the appropriate reticle for each exposure and positions the selected reticle on reticle stage 130.

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, the translatable wafer stage supporting the photoresist-coated wafer moves the wafer so that the radiation exposes the correct location of the wafer.

Wafer positioning system 120 is supported by air bearings 124. Air bearings 124 serve to isolate wafer positioning system from mechanical vibrations that could otherwise be transferred through wafer stage 142 to wafer 122. Air bearings 124 include pneumatic chambers that are supplied with a high-pressure gas. This gas is supplied to air bearings 124 by a pump 125 through a manifold 126.

Lithography system 100 also includes an interferometry system that precisely measures the position of the wafer in the lithography system. The interferometry system includes an interferometer 150 and a measurement object 152. Interferometer 150 is attached to wafer positioning system 120 and measurement object 152 is attached to wafer stage 142. Measurement object 152 includes, e.g., a plane mirror or retroreflector for reflecting a measurement beam 155 directed to the stage by interferometer 150. The measurement beam reflects back to the interferometer 150.

Lithography system 100 is enclosed in a chamber 101, which allow the wafer's environment to be controlled during exposure. Chamber 101 helps to reduce contaminants (e.g., dust or undesirable gases), which may scatter and/or absorb the exposing radiation and degrade the light pattern at the wafer. An access port 105 provides access to the exposure apparatus, wafer feeding system and reticle chamber.

In some embodiments, the lithography system can include what is known in the art as a column reference. In such embodiments, the interferometer 150 directs the reference beam (not shown) along an external reference path that contacts a reference mirror (not shown) mounted on some structure that directs the radiation beam, e.g., reduction lens 140. The reference mirror reflects the reference beam back to the interferometry system. The interference signal produced by the interferometry system when combining measurement beam 155 reflected from measurement object 152 and the reference beam reflected from a reference mirror mounted on the reduction lens 140 indicates changes in the position of the stage relative to the radiation beam.

Examples of suitable interferometry systems are described below. Although not included in the described embodiment, one or more interferometry systems can also be used to precisely measure the position of the reticle stage as well as other movable elements whose position must be accurately monitored in processes for fabricating lithographic structures (see supra, Sheats and Smith, *Microlithography: Science and Technology*).

In general, interferometry systems can be used to precisely measure the positions of each of the wafer stage and reticle stage relative to other components of the exposure system, such as the lens assembly, radiation source, or support structure. In such cases, as in the described embodiment, the interferometer is attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Chamber 101 includes a process gas inlet 180, which is positioned to flush the area around the wafer with a process gas at certain stages during an exposure cycle. This can be especially important when the exposing radiation is strongly absorbed or scattered by air. UV radiation, for example, is strongly absorbed by oxygen, making oxygen-rich atmospheres, such as air, undesirable for UV systems. Thus, in the present embodiment, the wafer is flushed with extremely pure nitrogen immediately prior to exposing wafer 122.

Chamber 101 also includes a gas inlet 190 and a gas exhaust 182 for introducing and removing gas(es) into and out of the chamber, respectively, allowing control over the chamber atmosphere. During operation of the system, nitrogen from nitrogen source 192 flows into chamber 101 through gas inlet 190. This nitrogen is the primary component to the chamber atmosphere, and is referred to as the background gas in this embodiment. In other embodiments, the background gas can include additional components, or can include one or more gases other than nitrogen. At the opposite end of the chamber, this nitrogen is removed from the chamber through gas exhaust 182, resulting in a constant flow of background gas through the chamber.

At certain stages during the operation of the system, a small amount of a secondary gas (e.g., water vapor or oxygen) is added to the background gas in order to reduce static discharge inside chamber 101. The secondary gas is stored in secondary gas source 194, and is mixed with the background gas in manifold 199.

A compensating gas, stored in compensating gas source 196 is mixed with the secondary gas in manifold 199 prior to mixing the secondary gas with the background gas. The compensating gas is selected to reduce variations of the refractivity of the chamber atmosphere due to non-isotropic distributions of the secondary gas in the chamber. Because the compensating gas is mixed with the secondary gas in manifold 199, the secondary and compensating gases enter chamber 101 as a modified secondary gas mixture. In other embodiments, however, the secondary gas can be introduced into chamber 101 unmixed, as long as they are adequately mixed by the time they reach the vicinity of measurement beam 155.

Another source that can result in non-isotropic distributions of a secondary gas in chamber 101 is gas leaking into the chamber from air bearings 124. Although the primary gas in the air bearings can be selected to have the same nitrogen-rich composition as the background gas, the air bearing gas can also include contaminants such as, e.g., organic compounds from pump oil. To mitigate the effect leaks from air bearings 124 into the chamber, lithography system 100 also includes an additional source 128 of compensating gas, which is mixed with the air bearing gas in manifold 126. This compensating gas is selected to reduce the effects of non-isotropic distributions of air bearing gas leaked into chamber 101 on interferometry measurements made in the system. The type and amount of compensating gas mixed with the gas pumped to the air bearings can be determined empirically by monitoring the composition of gas pumped through pump 125 prior to being installed in lithography system 100.

In general, the background gas, secondary gas, and/or compensating gas can include one or more components. For example, the secondary gas used in the air bearings can be a mixture of nitrogen and water vapor, or air. Specific combinations of gases are discussed in relation to different types of interferometry measurements below. Different embodiments of interferometry systems are shown and described. While they differ in some details, the described embodiments otherwise share many common elements. As will be seen, the described embodiments differ in the details of how their interferometric optical paths are implemented and/or how certain information signals are handled electronically.

Figure 2:
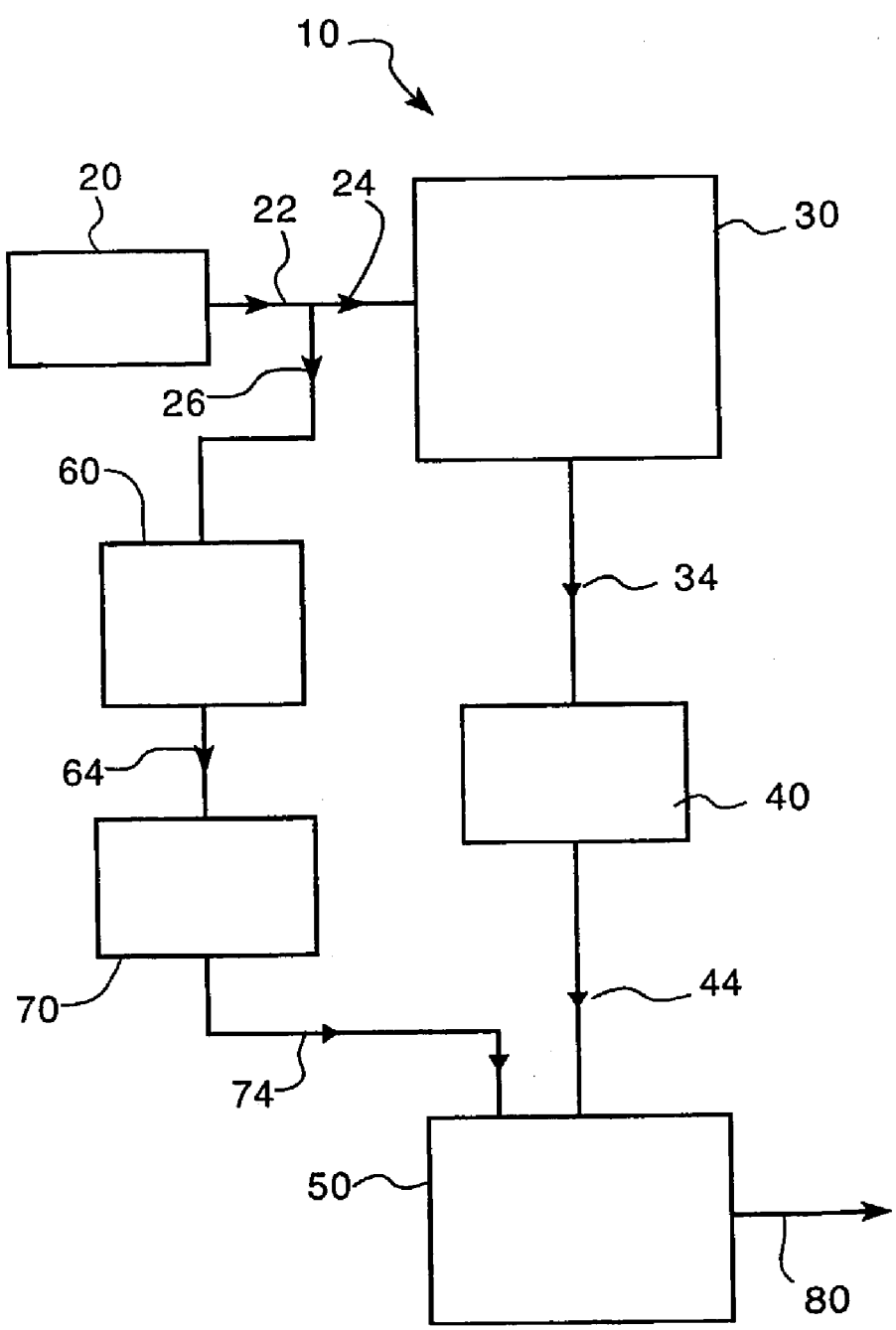
FIG. 2 is a schematic diagram of an interferometry system.

Referring to FIG. 2, an interferometry system generally shown at numeral 10 includes a source 20, an interferometer 30, detectors 40 and 70, an electronic processor 50, and monitor 60. Source 20 includes a laser or some other source of a coherent beam for providing beam 22 comprising one or more components wherein a first portion of beam 22 is transmitted to interferometer 30 as beam 24 and a second portion of beam 22 reflected to monitor 60 as beam 26. For single-wavelength interferometry, monitor 60 may comprise a refractometer and/or a wavelength monitor. For interferometry requiring two or more wavelengths, beam 22 includes at least two beams at different wavelengths, e.g., 1064 nm and 532 nm and monitor 60 may comprise a refractometer, a Γ monitor, and/or wavelength monitors. A Γ monitor measures the reciprocal dispersive power of a gas. For optical path displacement measurements, a single wavelength may be sufficient.

When using heterodyne interferometry techniques at one or more different wavelengths, source 20 introduces a frequency splitting between components of each beam at the one or more different wavelengths. For example, one or more acousto-optical modulators can be used to introduce the frequency splitting, or alternatively, the source can include a Zeeman-split laser to produce the frequency splitting. Often the frequency-split components are made to have orthogonal polarizations. The frequency-split components of beams 22 can be sent to interferometer 30 where they are separated in interferometer 30 into measurement and reference beams.

Interferometer 30 can be any type of interferometer, e.g., a differential plane mirror interferometer, a double-pass interferometer, a Michelson-type interferometer and/or a similar device such as is described in an article entitled "Differential interferometer arrangements for distance and angle measurements: Principles, advantages and applications" by C. Zanoni, *VDI Berichte* Nr. 749, 93–106 (1989). Interferometer 30 may also comprise a passive zero shear plane mirror interferometer as described in the commonly owned U.S. patent application Ser. No. 10/207,314 filed Jul. 29, 2002 and entitled "PASSIVE ZERO SHEAR INTERFEROMETERS" or an interferometer with a dynamic beam steering element such as described in commonly owned U.S. patent application with Ser. No. 09/852,369 filed May 10, 2001 and entitled "APPARATUS AND METHOD FOR INTERFEROMETRIC MEASUREMENTS OF ANGULAR ORIENTATION AND DISTANCE TO A PLANE MIRROR OBJECT" and commonly owned U.S. Pat. No. 6,271,923 issued Aug. 7, 2001 entitled "INTERFEROMETRY SYSTEM HAVING A DYNAMIC BEAM STEERING ASSEMBLY FOR MEASURING ANGLE AND DISTANCE," all of which are by Henry Allen Hill. The contents of the article by Zanoni and the three cited patents by Hill are included herein in their entirety by way of reference. The interferometer can be designed to monitor, for example, changes in optical path length, changes in physical path length, changes in wavelength of a beam, or changes in direction of propagation of a beam.

Interferometer 30 may also comprise interferometers configured to measure the shape of stage mirrors in-situ such as described in commonly owned U.S. patent application Ser. No. 09/853,114 entitled "IN-SITU STAGE MIRROR CHARACTERIZATION," filed May 10, 2001, by Henry Allen Hill. The contents of the two cited applications relating to the shape of stage mirrors are herewithin included in their entirety by way of reference.

Interferometer 30 directs a reference beam along a reference path (which contact a reference object) and a measurement beam along a measurement path contacting a measurement object (e.g., a lithography stage), and then combines the reference and measurement beams to form beam 34 as an overlapping pair of exit beams. In dispersion interferometry applications, there are overlapping pairs of exit beams for each of the different wavelengths.

The interference between the overlapping pair of exit beams contains information about the relative difference in optical path length between the reference and measurement paths. In some embodiments, the reference path is fixed and therefore changes in the optical path length difference correspond to changes in the optical path length of the measurement path. In other embodiments, however, the optical path length of both the reference and measurement paths can be changing. For example, the reference path can contact a reference object (e.g., a column reference) that may move relative to the interferometer. In this latter case, the changes in the optical path length difference correspond to changes in the position of the measurement object relative to changes in position of the reference object.

When the reference and measurement beams have orthogonal polarizations, the intensity of at least one intermediate polarization of the overlapping pair of exit beams is selected to produce optical interference. For example, a polarizer can be positioned within detector 40. Detector 40 measures the intensity of the selected polarization of the overlapping pair of exit beams to produce an interference signal. Portions of the beams can be combined with one another before being directed along the reference and measurement paths to provide a reference pair of overlapping exit beams, which is used to provide a reference interference signal. Furthermore, in some embodiments, a polarizer is included in interferometer 30, and exit beam 34 emerges as a mixed beam having the selected polarization.

Detector 40 includes a photodetector that measures preferably by a quantum photon detector the intensity of the overlapping pair of exit beams having the selected polarization, and electronics such as a preamplifier and an analog-to-digital converter, which amplify the output from the photodetector and produce an electrical interference signal 44. Interference signal 44, preferably a digital signal corresponds to the optical interference. In dispersion interferometry applications, electrical interference signals are produced for each of the overlapping pair of exit beams (which correspond to different wavelengths) by using multiple photodetection channels within detector 40. Interference signal 44 is transmitted to electronic processor 50. Interferometer 30 and detector 40 may also include an optical fiber (not shown) to couple beam 34 to the photodetector.

For certain end use applications, the refractivity of the a gas in interferometer system 10 and in particular in monitor 60 is measured and monitored by a refractivity monitor or a refractometer. Monitor 60 may comprise a interferometric apparatus such as described in commonly owned U.S. Pat. No. 4,685,803 entitled "METHOD AND APPARATUS FOR THE MEASUREMENT OF THE REFRACTIVE INDEX OF A GAS" or U.S. Pat. No. 4,733,967 entitled "APPARATUS OF THE MEASUREMENT OF THE REFRACTIVE INDEX OF A GAS" both by Gary E. Sommargren, the contents of both cited patents herewithin included in their entirety by way of reference. A portion of input beam 26 is transmitted by monitor 60 to detector 70 as output beam 64. The description of detector 70 is the same as the corresponding portion of the description given for detector 40. Beam 64 is detected by detector 70 as electrical interference signal 74. Interference signal 74 is transmitted to analyzer 50, preferably in a digital format.

For applications wherein stability of the wavelengths of beam 22 is not sufficient to meet requirements of an end use application, monitor 60 may comprise a wavelength monitor. Signal 74 comprises an electrical interference signal corresponding to an optical interference signal of the wavelength monitor. Electronic processor 50 compensates for effects of changes of wavelengths of beam 22 in the generation of the output signal 80.

For applications wherein beam 22 comprises two or more wavelengths, monitor 60 may comprise a Γ monitor such as described in commonly owned U.S. Pat. No. 6,124,931 entitled "APPARATUS AND METHODS FOR MEASURING INTRINSIC OPTICAL PROPERTIES OF A GAS" by Henry Allen Hill, the contents of which are herewithin incorporated in their entirety by way of reference. Signal 74 comprises an electrical interference signal corresponding to an optical interference signal of the Γ monitor. Electronic processor 50 compensates for effects of changes in the refractivity of the gas due to changes in an isotropic composition using the information in the optical interference signal of the Γ monitor in the generation of output signal 80.

Effects of non-isotropic gas mixtures in the measurement path of interferometer 30 comprising a background gas and a secondary gas are compensated by adding a compensating gas to the secondary gas to form a modified secondary gas mixture such that an intrinsic refractive property of the combination of the background gas and the modified secondary gas mixture is isotropic independent of the concentration of the modified secondary gas mixture. Examples of intrinsic refractive properties are the specific refractivity of a gas in single-wavelength interferometry and the reciprocal dispersive power of a gas in two-wavelength dispersion interferometry.

The effects of changes in global refractive properties (e.g., the average refractivity of the chamber atmosphere) of the gas are compensated in electronic processor 50 by using measured values of the refractive properties of the gas at one location different from the measurement paths of the interferometer 30. The measured values of the global refractive properties of the gas are obtained by electronic processor 50 by processing information contained in interference signal 74. Phase information compensated for changes in the global refractive properties of the gas including effects of changes in gas density and global changes in composition is generated as output signal 80.

Figure 3:
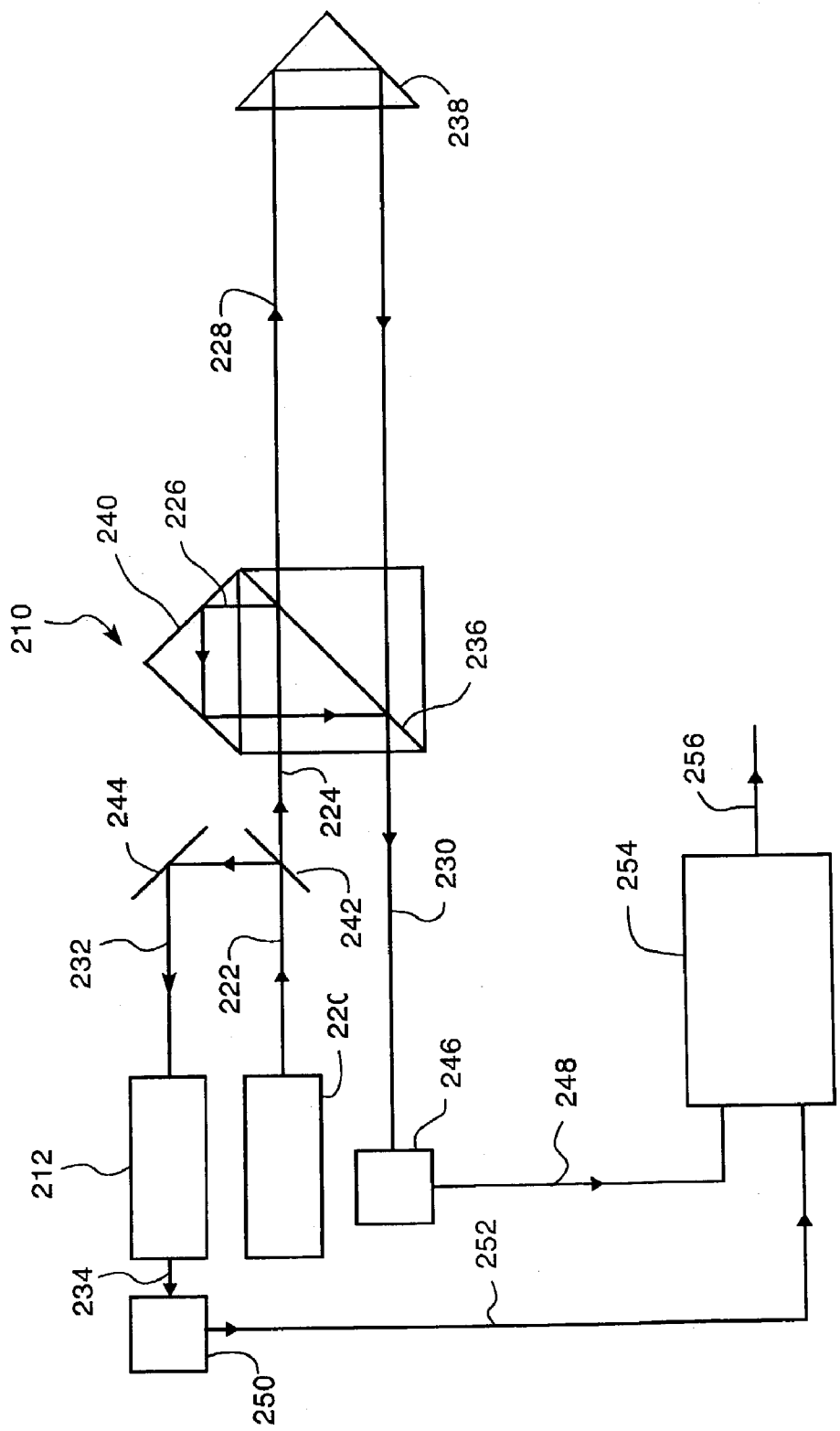
FIG. 3 is a schematic diagram of an interferometry system including a single-pass interferometer and a monitor.

Referring to FIG. 3, one example of an interferometer is depicted at numeral 210, which shows a polarizing, heterodyne, single pass interferometer. This configuration is known in the art as a polarized Michelson interferometer.

Although the present embodiment includes a heterodyne system, homodyne systems can also be used. In homodyne systems, the reference and measurement beams have the same frequencies. While the apparatus has application for a wide range of radiation sources, the following description is taken by way of example with respect to an optical measuring system.

Referring to FIG. 3, a first portion of light beam 222 emitted from source 220 is transmitted by non-polarization beam-splitter 242 to form beam 224. A second portion of beam 222 is reflected by non-polarization beam-splitter 242 to form beam 232 after reflection by mirror 244. The description of source 220 is the same as the description given for source 20 of FIG. 2.

As shown in FIG. 3, interferometer 210 comprises an object retroreflector 238, a reference retroreflector 240, and a polarization beam-splitter with a polarization beam-splitter interface 236. The measurement beam component of beam 224 is transmitted by polarization beam-splitting interface 236 as beam 228. Beam 228 is reflected by object retroreflector 238 and then transmitted by polarization beam-splitting interface 236 as a measurement beam component of output beam 230. The reference beam component of beam 224 is reflected by polarization beam-splitting interface 236 as beam 226. Beam 226 is reflected by reference retroreflector 240 and then reflected by polarization beam-splitting interface 236 as a reference beam component of output beam 230. The reference and measurement beam components of output beam 230 contain information at wavelength $\lambda_1$ about the optical path length through the reference and measurement paths, respectively. Beam 230 exits interferometer 210 and enters detector 246 to produce electrical interference signal 248. Detector 246 includes an analyzer to select common polarization states of the components of beam 230.

Interferometer 210 introduces phase shift $\phi_1$ between the measurement and reference beam components of beam 230 so that beam 230 is a phase-shifted beam. The magnitude of phase shift $\phi_1$ is related to round-trip physical length $2L_1$ of the measurement path, and the index of refraction according to the formula $$\varphi_1 = 2k_1 L_1 \left\{ 1 + (n_1 - 1)_s \left(\frac{P}{RT}\right) + \left\{ \begin{array}{c} [(n_2 - 1)_s - (n_1 - 1)_s]x_2 + \\ [(n_3 - 1)_s - (n_1 - 1)_s]x_3 \end{array} \right\} \left(\frac{P}{RT}\right) \right\} \quad (1)$$

where $(n_1-1)_s$ and $(n_2-1)_s$ are the averages of the specific refractivities of the background and secondary gases in the measurement path, $(n_3-1)_s$ is the average of the specific refractivity along the measurement path of the compensating gas used to alter the secondary gas, $x_2$ and $x_3$ are the average fractional partial pressures of the secondary and compensating gases, respectively, along the measurement path, R is the universal gas constant, P and T are the pressure and temperature of the gas, respectively, and wavenumber $k_1 = 2\pi/\lambda_1$. The specific refractivity of a sample of gas is defined as the ratio of the refractivity and density ρ of the gas sample, i.e., $(n-1)/\rho$. The specific refractivity of a gas such as air is an intrinsic property of the gas and is independent of the density of the gas to a high accuracy [see K. E. Erickson "Long-Path Interferometry through an Uncontrolled Atmosphere," *JOSA* 52, 781–787 (1962)].

It is evident from examination of Eq. (1) that effects of non-isotropic mixtures of the background gas and the modified secondary gas mixture in the measurement path is compensated when $$x_3 = -\frac{[(n_2 - 1)_s - (n_1 - 1)_s]}{[(n_3 - 1)_s - (n_1 - 1)_s]} x_2. \quad (2)$$

The condition expressed by Eq. (2) is met in the first embodiment of the present invention by introducing the compensating gas into interferometer system 10 in the same manner as the introduction of the secondary gas.

Examples of partial pressure ratios that meet the condition expressed by Eq. (2) at $\lambda_1 = 0.633\mu$ for different primary and secondary gases and the added gas with fractional partial pressure $x_3$ used for altering the secondary gas are listed in Table 1.

TABLE 1

Partial Pressure Ratios for Compensation of Effects of Non-Isotropic Gas Compositions in Single-Wavelength Interferometry

| Primary Gas | Secondary Gas ($x_2$) | Compensating Gas ($x_3$) | $\dfrac{x_3}{x_2}$ |
|---|---|---|---|
| Air | $H_2O$ | $CO_2$ | 0.30 |
|  | $O_2$ | $CO_2$ | 0.143 |
|  | $O_2$ | Ethane $CH_3CH_3$ | 0.039 |
|  | $O_2$ | $NO_2$ | 0.109 |
| $N_2$ | $H_2O$ | $CO_2$ | 0.51 |
|  | $O_2$ | $CO_2$ | 0.21 |
|  | $O_2$ | Ethane $CH_3CH_3$ | 0.050 |
|  | $O_2$ | $NO_2$ | 0.140 |

Although the interferometer shown in FIG. 3 is for a single-pass interferometer system, to those skilled in the art, generalizing to the case of a multiple-pass interferometer system is a straight forward procedure.

Beam 232 as illustrated in FIG. 3 is incident on monitor 212. An output beam 234 from monitor 212 is incident on a detector 250. Detector 250 generates a signal 252 related to the refractivity of the atmosphere at the location of monitor 212. Signal 252 is transmitted to electronic processor 254, where it is used to compensate the interferometry system's optical path length measurement.

When the condition expressed by Eq. (2) is met, a value of the refractivity required to correct the measured phase $\phi_1$ can be measured at a location different from that of the measurement path for a uniform value of P/T. When the ratio P/T is not sufficiently uniform to meet requirements of an end use application, other techniques may be introduced to compensate for the subsequent temperature effects such as described in the third and fourth embodiments of the present invention.

Figure 4:
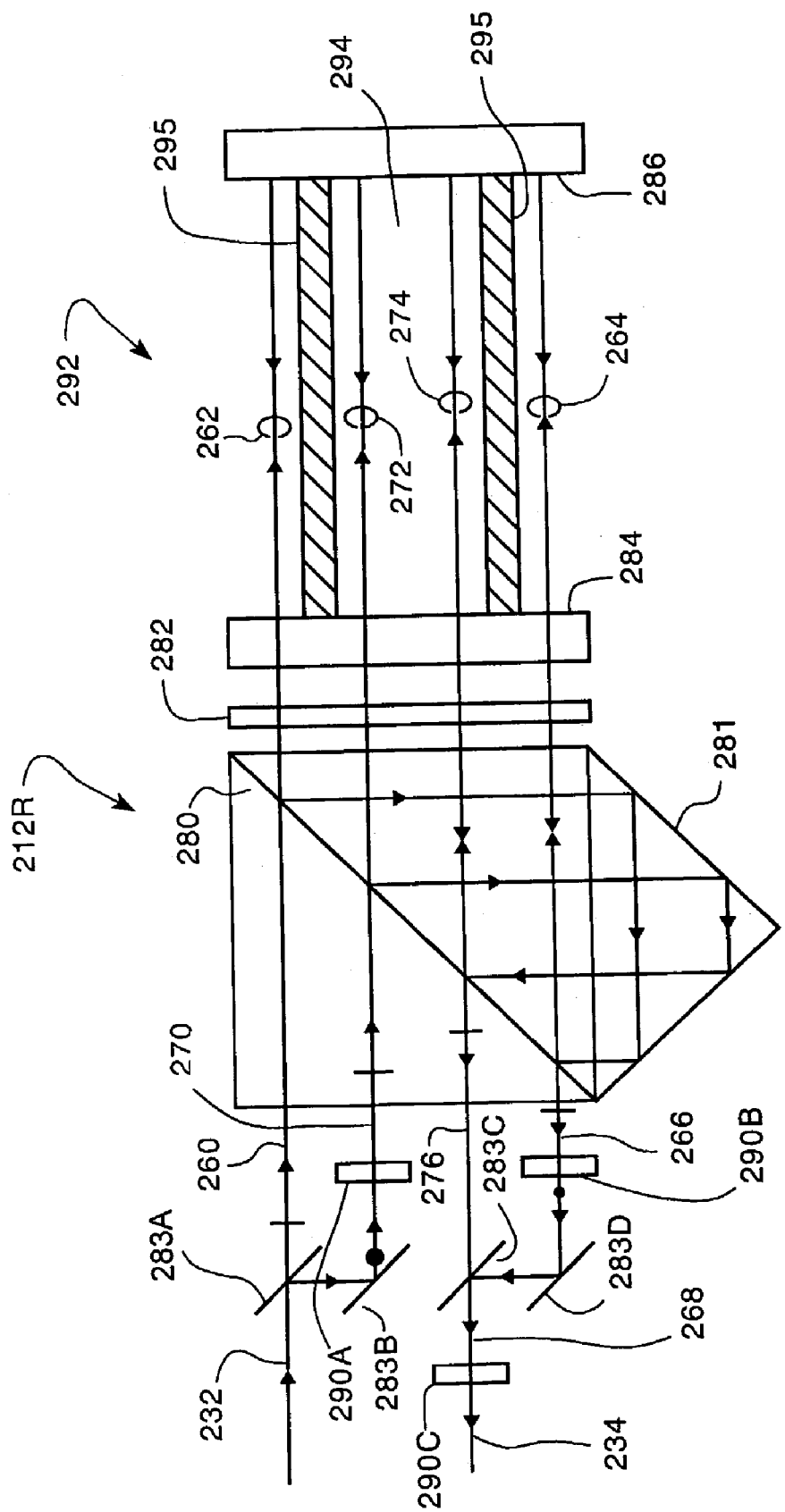
FIG. 4 is a schematic diagram of a refractivity monitor.

Referring to FIG. 4, monitor 212 includes refractometer 212R. Beam 232 is incident on refractometer 212R, and a portion thereof exits as output beam 234. Beam 234 contains phase information that can be used to obtain measured values of the refractivity of the gas in refractometer 212R. Refractometer 212R includes a differential plane mirror interferometer (DPMI) and a cell generally shown at numeral 292. A measurement beam component of beam 232 is transmitted by a polarization beam-splitter 283A as measurement beam 260 and a reference beam component of beam 232 is reflected by polarization beam-splitter 283A as beam 270 after subsequent reflection by mirror 283B and transmission by half-wave phase retardation plate 290A. Phase retardation plate 290A is oriented so as to rotate the plane of polarization of beam 270 to be parallel to the plane of FIG. 4.

As illustrated in FIG. 4, beam 260 is incident on refractometer 212R and exits refractometer 212R containing phase information about the measurement path through cell 292. Beam 270 is incident on refractometer 212R and exits refractometer 212R containing phase information about the reference path through cell 292. Interface 280 is a polarizing interface, element 282 is a quarter-wave phase retardation plate, and element 281 is a retroreflector.

Cell 292 comprises window 284, mirror 286, and cylinder 295 to form a chamber 294 that is evacuated. The measurement beams in cell 292 are beams 262 and 264 and the reference beams in cell 292 are beams 272 and 274. Paths of measurement beams 262 and 264 comprise the gas and paths of reference beams 272 and 274 comprise a vacuum.

Measurement beam 266 is first transmitted by half-wave phase retardation plate 290B and then reflected by mirror 283D and polarization beam-splitter 283C as a measurement beam component of beam 268 (see FIG. 4). Phase retardation plate 290B is oriented to rotate the plane of polarization of beam 266 upon transmission by phase retardation plate 290B to be orthogonal to the plane of FIG. 4. Reference beam 276 is first transmitted by polarization beam-splitter 283C as a reference beam component of beam 268. Beam 268 is transmitted by polarizer 290C as output beam 234. Output beam 234 is a mixed beam wherein polarizer 290C is oriented to mix the measurement and reference beam components of beam 268.

Refractometer 212R introduces phase shift $\phi_2$ between the measurement and reference beam components of beam 234 so that beam 234 is a phase-shifted beam. The magnitude of phase shift $\phi_2$ is related to the relative physical length $L_2$ of the measurement and reference paths and refractivity of the gas according to the formula $$\varphi_2 = 2k_1 L_2 \left\{ 1 + (n_1-1)_s \left(\frac{P}{RT}\right) + \left\{ \begin{matrix} [(n_2-1)_s - (n_1-1)_s]x_2 + \\ [(n_3-1)_s - (n_1-1)_s]x_3 \end{matrix} \right\} \left(\frac{P}{RT}\right) \right\}_M \quad (3)$$

where the subscript M denotes the measurement and reference paths of monitor 212R.

In some embodiments, alternatively, or in addition to including a refractometer, monitor 212 includes a wavelength monitor. Such embodiments can include apparatus of the interferometry system and refractometer shown in FIGS. 3 and 4, respectively. An embodiment of a wavelength monitor is generally shown at 212W in FIG. 5.

Wavelength monitor 212W is a DPMI including a vacuum cell generally shown at 292W. Many elements of wavelength monitor 212W perform like functions and like numbered elements of refractometer 212R of the first embodiment. A first portion of beam 232 is split off by a non-polarization beam splitter (not shown in a figure) to form an input beam for refractometer 212R and the remaining portion of beam 232 is used as an input beam 1232 for wavelength monitor 212W.

Figure 5:
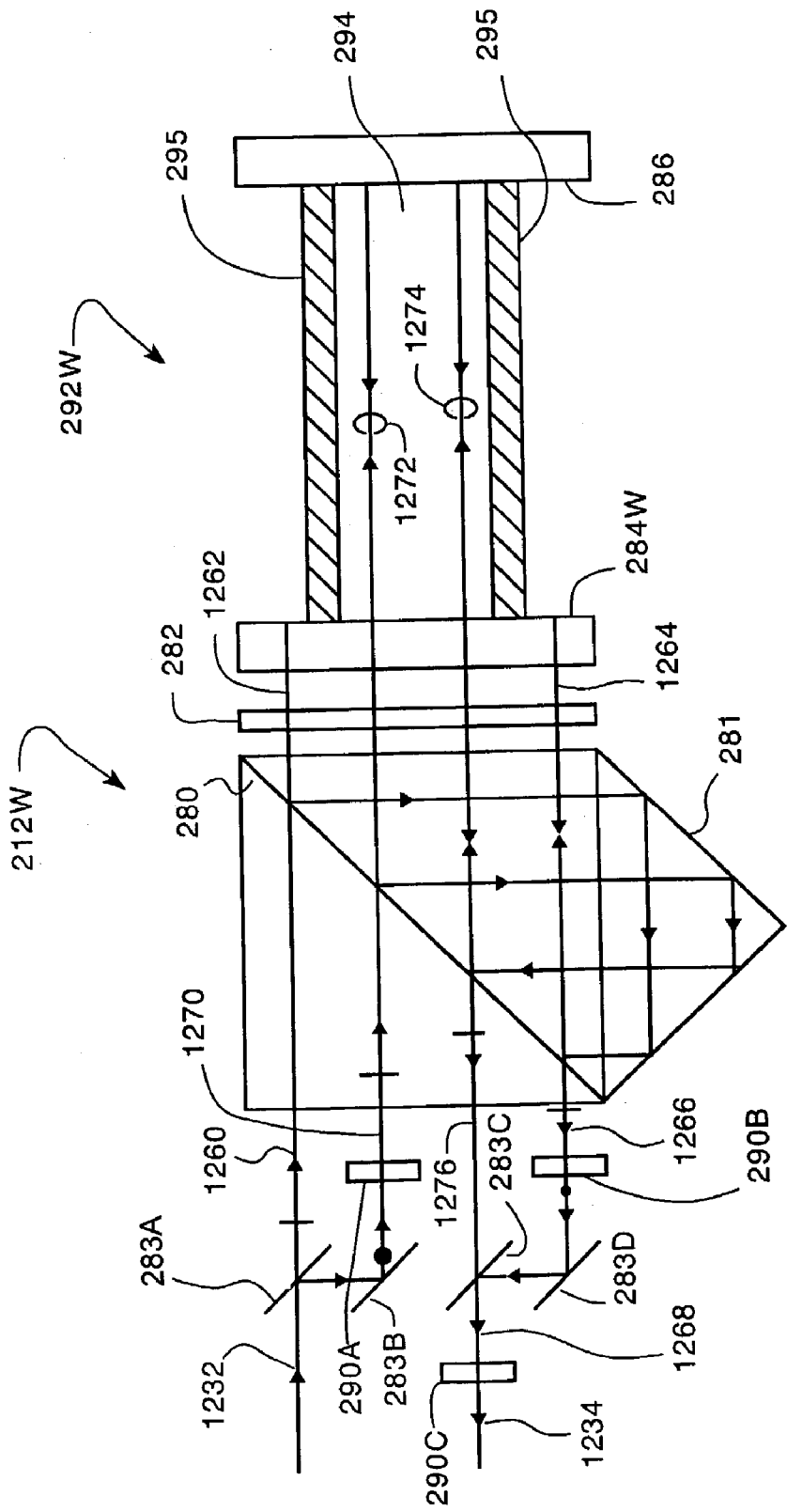
FIG. 5 is a schematic diagram of a wavelength monitor.

As illustrated in FIG. 5, beam 1260 is incident on refractometer 212W and exits refractometer 212W containing phase information about the measurement path through cell 292W. Beam 1270 is incident on refractometer 212W and exits refractometer 212W containing phase information about the reference path through cell 1292. Interface 280 is a polarizing interface, element 282 is a quarter-wave phase retardation plate, and element 281 is a retroreflector.

Cell 292W comprises an element 284W, mirror 286, and cylinder 295 to form a chamber 294 that is evacuated. Element 284W in vacuum cell 292W has a transmitting surface section for reference beams 1272 and 1274 and a reflecting surface section for measurement beams 1262 and 1264 wherein the transmitting and reflecting surface sections of element 284W belong to the same plane surface of element 284W. A measurement beam 1266 is first transmitted by half-wave phase retardation plate 290B and then reflected by mirror 283D and polarization beam-splitter 283C as a measurement beam component of beam 1268.

Phase retardation plate 290B is oriented to rotate the plane of polarization of beam 1266 upon transmission by phase retardation plate 290B to be orthogonal to the plane of FIG. 5. Reference beam 1276 is first transmitted by polarization beam-splitter 283C as a reference beam component of beam 1268. Beam 1268 is transmitted by polarizer 290C as output beam 1234. Output beam 1234 is a mixed beam wherein polarizer 290C is oriented to mix the measurement and reference beam components of beam 1268.

Wavelength monitor 212W introduces phase shift $\phi_3$ between the measurement and reference beam components of beam 1234 so that beam 1234 is a phase-shifted beam. The magnitude of phase shift $\phi_3$ is related to round-trip physical length $2L_3$ of the measurement and reference paths and wavenumber $k_1$ according to the formula $$\phi_3 = 2L_3 k_1. \quad (4)$$

The value for $2L_3$ corresponds to twice the physical length difference of the reference beam and measurement beam paths.

An electronic processor (e.g., electronic processor 254 shown in FIG. 3) further compensates phase $\phi_1$ for changes in wavelength $\lambda_1$ using measured values for $\phi_2$, $\phi_3$, $L_2$, and $L_3$ and Eqs. (1), (3), and (4). The accuracy to which the phase redundancy of $\phi_1$, $\phi_2$, and $\phi_3$ need be resolved will depend for example upon the measurement accuracy required for an end use application, the range of variations in $\phi_2$ and $\phi_3$, and the range of variation in $x_2$ and $x_3$.

In some embodiments, the interferometry system can be adapted to further compensate for effects of changes in refractivity of a gas in an interferometer's measurement beam path by measuring the refractivity of the gas at some location remote from the measurement beam path and mapping the measured refractivity to the refractivity in the measurement beam path using a non-trivial function. Examples of such embodiments are disclosed in commonly owned U.S. patent application Ser. No. 10/294,158, entitled "COMPENSATING FOR EFFECTS OF VARIATIONS IN GAS REFRACTIVITY IN INTERFEROMETERS," by Henry Allen Hill, filed Nov. 14, 2002. The contents of the cited application by Hill are included in their entirety by way of reference.

Figure 6:
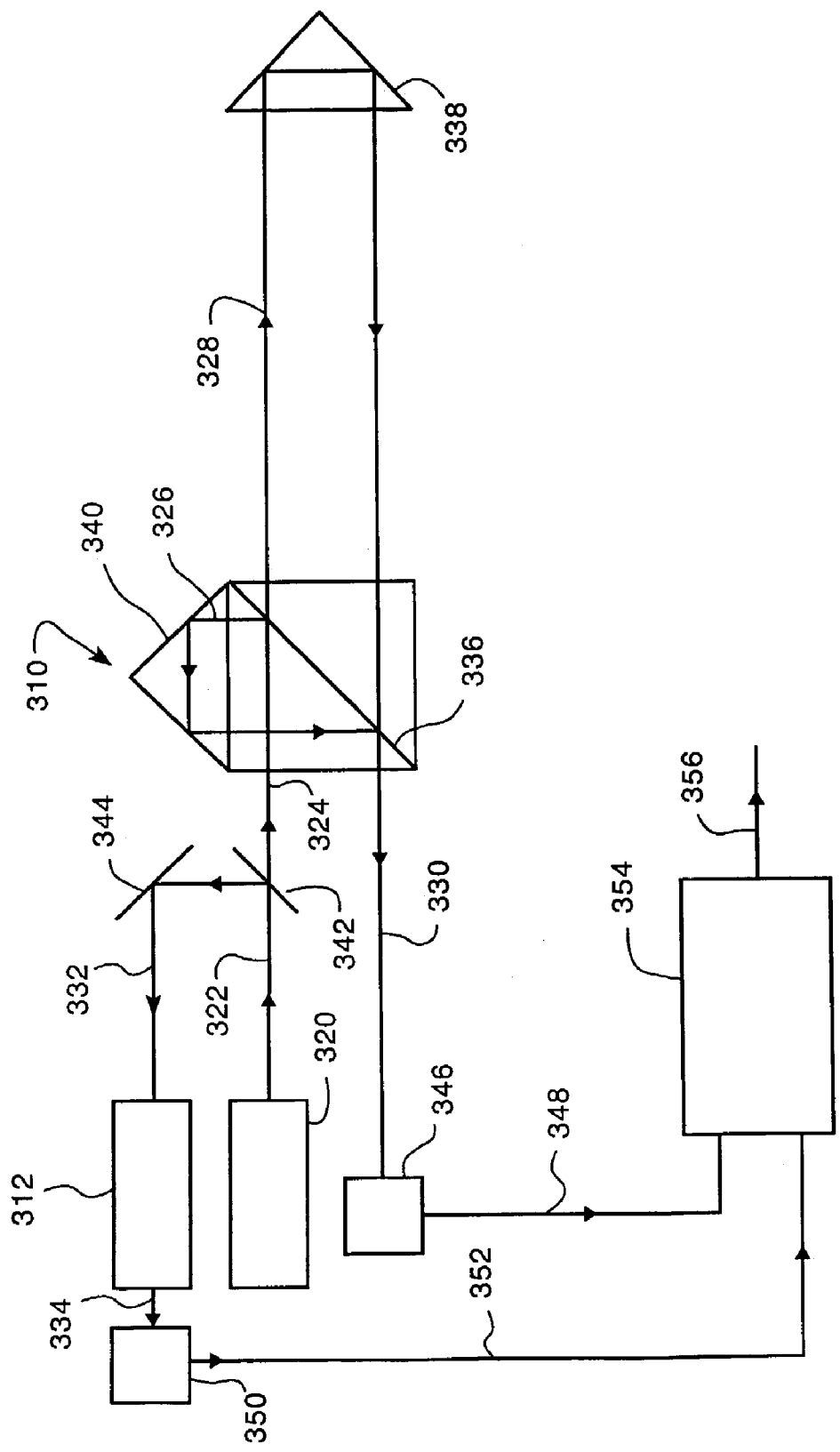
FIG. 6 is a schematic diagram of a interferometry system including a dispersion interferometer.

In some embodiments, the interferometry system can be a dispersion interferometry system. FIG. 6 depicts in schematic form an embodiment for compensating for the effects of variations in the spatial distribution of P/T from uniform spatial distributions of non-isotropic mixtures of a background and modified secondary gas mixtures in measurement paths of a two-wavelength dispersion interferometer system. The effects of variations in the spatial distribution of P/T from a uniform spatial distribution are compensated by use dispersion interferometry. The effects of the non-isotropic mixtures are compensated by adding a compensating gas to the secondary gas such the reciprocal dispersive power of combinations of background and modified secondary gas mixture is isotropic independent of the concentration of the modified secondary gas mixture. The effects of non-isotropic distributions of P/T and non-isotropic mixtures are compensated for both measured changes in the optical path length. Either or both the refractive index of the gas and the physical length of the measurement path may be changing.

The interferometer system of the fourth embodiment comprises a polarizing, heterodyne, single pass dispersion interferometer generally depicted in FIG. 6 at 310 and a monitor 312 comprising a Γ monitor such as described in cited U.S. Pat. No. 6,124,931, entitled "APPARATUS AND METHODS FOR MEASURING INTRINSIC OPTICAL PROPERTIES OF A GAS," to Henry Allen Hill. This configuration is known in the art as a polarized Michelson interferometer, and is shown as a simple illustration. Although the fourth embodiment comprises a heterodyne system, the instant invention is readily adapted for use in a homodyne system in which the reference and measurement beams have the same frequencies before introduction of any Doppler shifts.

Referring to FIG. 6, a first portion of light beam 322 emitted from source 320 is transmitted by non-polarization beam-splitter 342 to form beam 324. A second portion of beam 320 is reflected by non-polarization beam-splitter 342 to form beam 332 after reflection by mirror 344. Beam 322 comprises two beams having different wavelengths $\lambda_1$, and $\lambda_2$ that are for example harmonically related, e.g., 2 to 1. The description of source 320 for each of the two different wavelength beams of beam 322 is the same as the corresponding portion of the description given for source 220 of the first embodiment of the present invention.

As shown in FIG. 6, interferometer 310 comprises an object retroreflector 338, a reference retroreflector 340, and a polarization beam-splitter with a polarization beam-splitter interface 336 designed for operation at wavelengths $\lambda_1$ and $\lambda_2$. The measurement beam components of beam 324 are transmitted by polarization beam-splitting interface 336 as beam 328. Beam 328 is reflected by object retroreflector 338 and then transmitted by polarization beam-splitting interface 336 as measurement beam components of output beam 330. The reference beam components of beam 324 are reflected by polarization beam-splitting interface 336 as beam 326. Beam 326 is reflected by reference retroreflector 340 and then reflected by polarization beam-splitting interface 336 as reference beam components of output beam 330. The reference and measurement beam components of output beam 330 contain information at wavelength $\lambda_1$ about the optical path length through the reference and measurement paths and about the dispersion of the optical path length at wavelengths $\lambda_1$ and $\lambda_2$. Beam 330 exits interferometer 310 and enters detector 346 to produce signal 348 that comprises two electrical interference signals. Detector 346 comprises an analyzer to select common polarization states of the components of beam 330. An electronic processor 354 detects signal 348, and produces an output signal 356 which can be used to position the wafer.

An additional beam 332, derived from input beam 322, is directed by reflector 344 to monitor 312. An output beam 334 exits monitor 312 and is incident on a detector 350. Output beam 334 includes information about the reciprocal dispersive power of the atmosphere at the location of monitor 312. Detector 350 produces a signal 352 in response to output beam 334, which is used by electronic processor 354 to compensate output signal 356 for variations in the reciprocal dispersive power of the chamber atmosphere.

Interferometer 310 introduces phase shifts $\phi_4$ and $\phi_5$ between the measurement and reference beam components of beam 330 at wavelengths $\lambda_1$ and $\lambda_2$, respectively. The magnitudes of phase shifts $\phi_4$ and $\phi_5$ are related to round-trip physical length $2L_4$ of the measurement path, and the average index of refraction of the gas according to the formulae $$\phi_4 = 2k_1 L_4 (n)_{\lambda_2}, \quad (5)$$

$$\phi_5 = 2k_1 L_4 (n)_{\lambda_2} \quad (6)$$

where $(n)_{\lambda 1}$ and $(n)_{\lambda 2}$ are the averages of the refractive index of the gas in the measurement path at wavelengths $\lambda_1$ and $\lambda_2$, respectively. Eq. (5) may be rewritten as $$\phi_4 = 2k_1 L_4 \{1 + \Gamma[(n)_{\lambda 2} - (n)_{\lambda 1}]\} \qquad (7)$$

where $\Gamma$ is the reciprocal dispersive power of the gas in the measurement path at wavelengths $\lambda_1$ and $\lambda_2$ and $[(n)_{\lambda 2}-(n)_{\lambda 1}]$ is the dispersion of the gas for wavelengths $\lambda_1$ and $\lambda_2$.

The dispersion is obtained by processor 354 from shifts $\phi_4$ and $\phi_5$ with the use of Eqs. (5) and (6). The reciprocal dispersive power $\Gamma$ may be expressed as $$\Gamma = \Gamma_1 \left\{ 1 + \left[\frac{(n_2-1)_{\lambda 2}-(n_2-1)_{\lambda 1}}{(n_1-1)_{\lambda 1}}\right](\Gamma_2-\Gamma_1)x_2 + \left[\frac{(n_3-1)_{\lambda 2}-(n_3-1)_{\lambda 1}}{(n_1-1)_{\lambda 1}}\right](\Gamma_3-\Gamma_1)x_3 \right\} \qquad (8)$$

where $\Gamma_1$, $\Gamma_2$, and $\Gamma_3$ are the reciprocal dispersive powers of the background gas, the secondary gas, and the compensating gas, respectively, wherein first order terms have been retained.

It is evident from examination of Eq. (8) that effects of non-isotropic mixtures of the background and secondary gases in the measurement path are compensated when $$x_3 = -x_2 \left[\frac{(n_2-1)_{\lambda 2}-(n_2-1)_{\lambda 1}}{(n_3-1)_{\lambda 2}-(n_3-1)_{\lambda 1}}\right]\left[\frac{(\Gamma_2-\Gamma_1)}{(\Gamma_3-\Gamma_1)}\right]. \qquad (9)$$

The condition expressed by Eq. (9) is met by introducing the compensating gas into interferometer system 310 in the same manner as the introduction of the secondary gas. The condition expressed by Eq. (9) is equivalent to a condition wherein the reciprocal dispersive power of the modified secondary gas mixture is the same as the reciprocal dispersive power of the background gas.

The factor $$\left[\frac{(n_2-1)_{\lambda 2}-(n_2-1)_{\lambda 1}}{(n_3-1)_{\lambda 2}-(n_3-1)_{\lambda 1}}\right] \qquad (10)$$

in Eq. (9) is an intrinsic property of the gas and can therefore be determined for any combination of gas pressure and temperature approximating the corresponding parameters used in a particular end use application. Examples of partial pressure ratios that meet the condition expressed by Eq. (9) at wavelengths $\lambda_1 = 0.633$ μm and $\lambda_2 = 0.316$ μm for air as a background gas and different secondary gases and compensating gases with fractional partial pressure $x_3$ are listed in Table 2. Similar results are obtained for the partial pressure ratios with nitrogen for the background gas.

Alternatively, or in addition to including a $\Gamma$ monitor, embodiments of dispersion interferometry systems can include one or more wavelength monitors for monitoring the wavelength of one or both of the operating wavelengths of the interferometer.

TABLE 2

Partial Pressure Ratios for Compensation of Effects of Non-Isotropic Gas Compositions in Two-Wavelength Dispersion Interferometry

| Primary Gas | Secondary Gas ($x_2$) | Compensating Gas ($x_3$) | $\frac{x_3}{x_2}$ |
|---|---|---|---|
| Air | $O_2$ | $H_2O$ | 0.27 |
|  | $O_2$ | $CO_2$ | 0.57 |

Other multiple wavelength dispersion interferometry systems can be designed wherein the effects of non-isotropic gas compositions are compensated. Conditions of the type expressed by Eqs. (2) and (9) are obtained by adding a compensating gas to the secondary gas such that a corresponding dispersive property of the background gas, secondary gas, and compensating gas is isotropic independent of the spatial distribution of the concentration of the modified secondary gas mixture. It will be evident for those skilled in the art how to extend the embodiments described for the present invention to three or more wavelengths without departing from the scope and spirit of the present invention.

Referring again to FIG. 1, in other embodiments of the lithography system, one or more of the interferometry systems described can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

Figure 7:
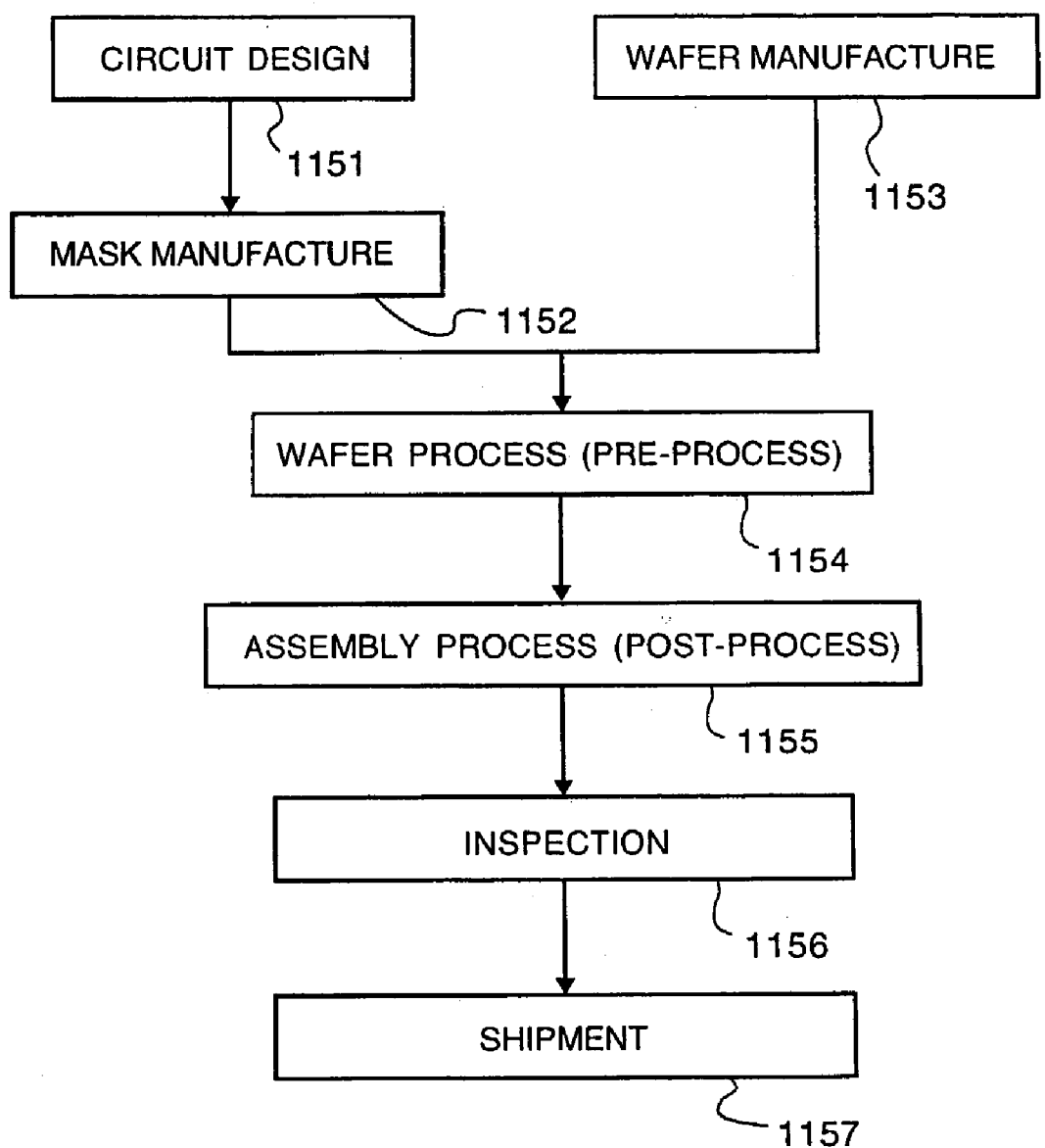
FIG. 7 is a flow chart showing stages of a semiconductor device manufacture.

As is well known in the art, lithography is a critical part of manufacturing methods for making semiconducting devices. For example, U.S. Pat. No. 5,483,343 outlines steps for such manufacturing methods. These steps are described below with reference to FIGS. 7 and 8. FIG. 7 is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 8:
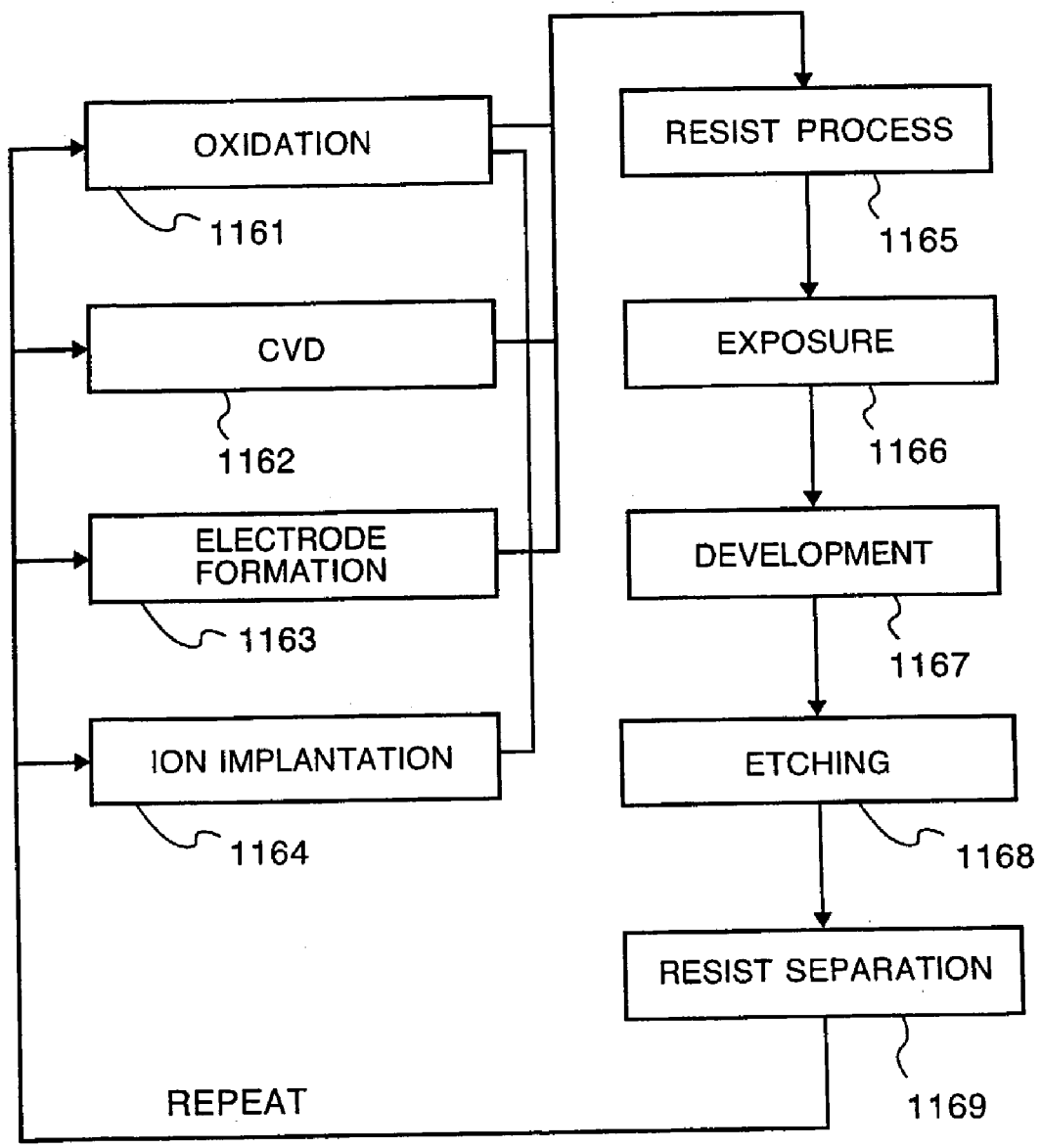
FIG. 8 is a flow chart showing details of the wafer process.

FIG. 8 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 9:
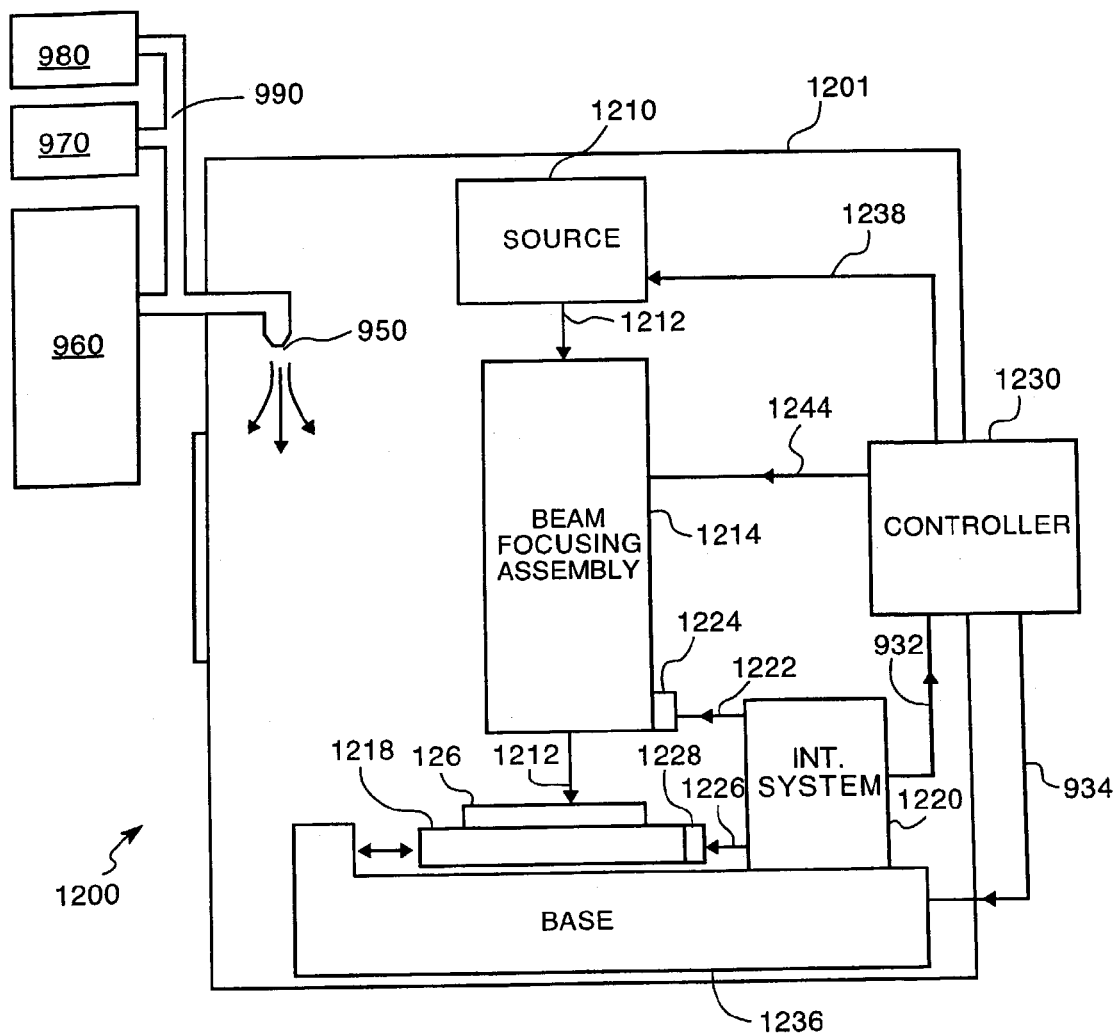
FIG. 9 is a schematic diagram of a beam writing system.

As an example, a schematic of a beam writing system 1200 is shown in FIG. 9. A chamber 1201 houses beam writing system 1200. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 932 to controller 1230 that is indicative of the relative position of write beam 1212 on substrate 1216. Controller 1230 sends an output signal 934 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate. Controller 1230 can be housed within chamber 1201, can be mounted on the outside of the chamber, or can be located at some location remote from chamber 1201.

Beam writing system 1200 also includes gas sources 960, 970, and 980. Gas source 960 provides a background gas to chamber 1201 through gas inlet 950. At different stages during operation of beam writing system 1200, gas source 970 introduces a secondary gas into chamber 1201 through gas inlet 950. At the same time that the secondary gas is introduced, gas source 980 introduces a compensating gas into chamber 1201. The compensating gas reduces the effects of non-isotropic distributions of the secondary gas on interferometry measurements made in the chamber. The compensating gas and secondary gas mix in manifold 990 and enter chamber 1201 through gas inlet 950 as a modified secondary gas mixture.

In some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
    making an interferometry measurement in a chamber, wherein making the interferometry measurement comprises directing a beam along a path between an interferometer and a measurement object moveable with respect to the interferometer, the chamber having an atmosphere that has a first value of an intrinsic refractive property in the beam path;
    introducing a secondary gas into the chamber to adjust a composition of the chamber atmosphere; and
    introducing a compensating gas into the chamber,
    to reduce variations in the intrinsic refractive property of the atmosphere in the beam path from the first value caused by the introduction of the secondary gas.

2. The method of claim 1, wherein the interferometry measurement measures the position of a movable stage in the chamber.

3. The method of claim 1, wherein the interferometry measurement comprises:
    deriving the beam and another beam from an input beam having a first wavelength;
    directing the beam to reflect from the measurement object;
    overlapping the reflected beam with the other beam; and
    detecting an intensity of the overlapping reflected beam and other beam.

4. The method of claim 1, wherein the compensating gas is introduced into the chamber while introducing the secondary gas.

5. The method of claim 1, further comprising flowing a background gas through the chamber, wherein the chamber atmosphere comprises the background gas.

6. The method of claim 5, wherein introducing the secondary gas into the chamber comprises adding the secondary gas to the background gas prior to flowing the background gas through the chamber.

7. The method of claim 5, wherein introducing the compensating gas into the chamber comprises adding the compensating gas to the background gas prior to flowing the background gas through the chamber.

8. The method of claim 1, wherein introducing the secondary and compensating gases comprises introducing a gas mixture into the chamber, the gas mixture comprising the secondary gas and the compensating gas.

9. The method of claim 8, wherein introducing the gas mixture comprises leaking the gas mixture into the chamber.

10. The method of claim 9, wherein the gas mixture leaks into the chamber from an air bearing.

11. The method of claim 1, wherein the chamber houses a photolithography exposure apparatus.

12. The method of claim 11, wherein interferometric measurement and secondary gas introduction occur during an exposure cycle of the photolithography exposure apparatus.

13. The method of claim 1, wherein the chamber houses a beam writing apparatus.

14. The method of claim 1, wherein the intrinsic refractive property is a specific gas refractivity.

15. The method of claim 14, wherein the chamber atmosphere comprises a background gas having a specific refractivity $(n_1-1)_s$ at a first wavelength, the secondary gas having a specific refractivity $(n_2-1)_s$ at the first wavelength, and the compensating gas having a specific refractivity $(n_2-1)_s$ at the first wavelength, and wherein $(n_1-1)_s \neq (n_2-1)_s$.

16. The method of claim 15, wherein $(n_1-1)_s > (n_2-1)_s$ and $(n_3-1)_s > (n_1-1)_s$.

17. The method of claim 15, wherein $(n_1-1)_s < (n_2-1)_s$ and $(n_3-1)_s < (n_1-1)_s$.

18. The method of claim 15, wherein the secondary gas has fractional partial pressure, $x_2$, and the compensating gas has a fractional partial pressure, $x_3$, and $$x_3 \simeq -\frac{[(n_2-1)_s - (n_1-1)_s]}{[(n_3-1)_s - (n_1-1)_s]} x_2.$$

19. The method of claim 1, wherein the interferometry measurement is a dispersive interferometric measurement.

20. The method of claim 19, wherein the intrinsic refractive property is a reciprocal dispersive power.

21. The method of claim 20, wherein a fractional partial pressure of the compensation gas is related to a fractional partial pressure of the secondary gas based on a specific refractivity of the secondary and compensation gases at a first wavelength, $\lambda_1$ and at a second wavelength, $\lambda_2$.

22. The method of claim 21, wherein the atmosphere comprises a background gas, and a fractional partial pressure of the compensation gas is related to a fractional partial pressure of the secondary gas based on a reciprocal dispersive power of the background gas, a reciprocal dispersive power of the secondary gas, and a reciprocal dispersive power of the compensation gas.

23. The method of claim 22, wherein the secondary gas has fractional partial pressure, $x_2$, and the compensation gas has a fractional partial pressure, $x_3$, and $$x_3 = -\left[\frac{(n_2-1)_{\lambda 2} - (n_2-1)_{\lambda 1}}{(n_3-1)_{\lambda 2} - (n_3-1)_{\lambda 1}}\right]\left[\frac{\Gamma_2 - \Gamma_1}{\Gamma_3 - \Gamma_1}\right] x_2,$$

wherein $\Gamma_1$, $\Gamma_2$, and $\Gamma_3$ are the reciprocal dispersive powers of the background, secondary, and compensation gases, respectively, $(n_2-1)_{\lambda 1}$ and $(n_2-1)_{\lambda 2}$ are the specific refractivity's of the second gas at the first and second wavelengths, respectively, and $(n_3-1)_{\lambda 1}$ and $(n_3-1)_{\lambda 1}$ are the specific refractivity's of the third gas at the first and second wavelengths, respectively.

24. The method of claim 1, wherein the chamber atmosphere comprises air.

25. The method of claim 1, wherein the chamber atmosphere comprises nitrogen.

26. The method of claim 1, wherein the secondary gas comprises $H_2O$, $O_2$, a hydrocarbon, or mixtures thereof.

27. The method of claim 1, wherein the compensating gas comprises $CO_2$, $NO_2$, $CH_3CH_3$ or mixtures thereof.

28. The method of claim 1, further comprising measuring an intrinsic refractive property of the atmosphere at a location in the system, and correcting the interferometric measurement based on the measured intrinsic refractive property.

29. A system, comprising:
a movable stage;
an interferometry system configured to measure a position of the movable stage along a measurement path;
a chamber housing the movable stage and the interferometry system, the chamber having an atmosphere that has a first value of an intrinsic refractive property in the measurement path; and
secondary and compensating gas sources configured to introduce a secondary gas and compensating gas into the chamber,
wherein the compensating gas reduces variations in the intrinsic refractive property of the atmosphere in the measurement path from the first value caused by the introduction of the secondary gas.

30. The system of claim 29, further comprising photolithography exposure apparatus, the photolithography exposure apparatus being housed in the chamber.

31. The system of claim 30, wherein the photolithography exposure apparatus comprises an illumination source and during operation of the system the movable stage positions a wafer relative to the illumination source.

32. The system of claim 29, further comprising beam writing apparatus, the beam writing apparatus being housed in the chamber.

33. The system of claim 32, wherein the beam writing apparatus comprises a beam source and during operation of the system the movable stage positions a wafer relative to the beam source.

34. The system of claim 29, further comprising a gas inlet configured to introduce the secondary gas and the compensating gas into the chamber.

35. The system of claim 34, further comprising a gas manifold configured to direct secondary gas and compensating gas from the secondary gas source and compensating gas source to the gas inlet.

36. The system of claim 35, further comprising a background gas source configured to introduce a background gas into the chamber, wherein the chamber atmosphere comprises the background gas.

37. The system of claim 36, wherein the gas manifold is further configured to direct the background gas from the background gas source to the gas inlet.

38. The system of claim 36, wherein the secondary and compensating gases are added to the background gas prior to being introduced to the chamber.

39. The system of claim 29, further comprising a gas exhaust configured to exhaust gas out of the chamber.

40. The system of claim 29, further comprising air bearings configured to support the movable stage, wherein the air bearings are inflated with the secondary and compensating gases.

41. The system of claim 29, wherein the interferometry system comprises a refractometer configured to monitor a refractivity of the atmosphere at a first position within the chamber.

42. The system of claim 29, wherein the interferometry system comprises a wavelength monitor configured to monitor a wavelength of a measurement beam used in the interferometry system.

* * * * *